P. W. FLEISCHER.
CAN FEEDING MECHANISM.
APPLICATION FILED FEB. 18, 1914.
1,212,754.
Patented Jan. 16, 1917.
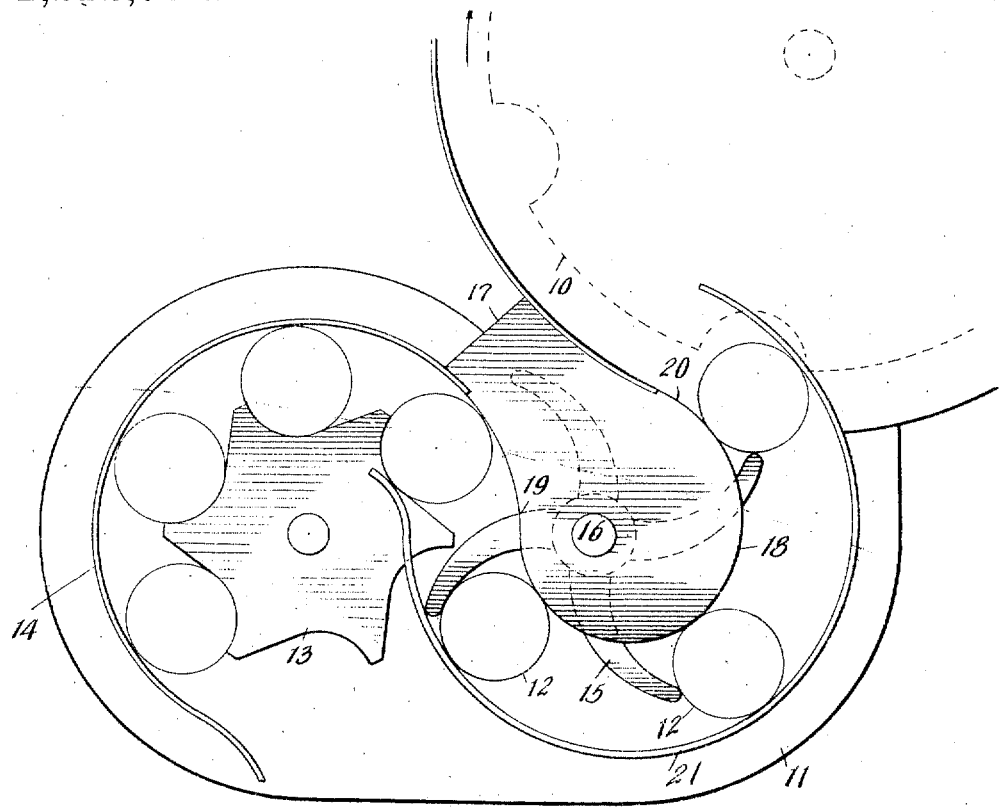
Witnesses:
Wm. Geiger
Esther Abrams
Inventor
Paul W. Fleischer
By Munday, Evarts, Adcock & Clarke
Attys

UNITED STATES PATENT OFFICE.

PAUL W. FLEISCHER, OF WEST HOBOKEN, NEW JERSEY, ASSIGNOR TO AMERICAN CAN COMPANY, OF NEW YORK, N. Y., A CORPORATION OF NEW JERSEY.

CAN-FEEDING MECHANISM.

1,212,754.  Specification of Letters Patent.  Patented Jan. 16, 1917.

Application filed February 18, 1914. Serial No. 819,309.

*To all whom it may concern:*

Be it known that I, PAUL W. FLEISCHER, a citizen of the United States, residing in West Hoboken, in the county of Hudson and State of New Jersey, have invented a new and useful Improvement in Can-Feeding Mechanisms, of which the following is a specification.

This invention relates to improvements in can feeding mechanism.

The object of the invention is to provide a simple arrangement whereby cans or other articles may be fed to a can closing machine or other machines for operating on the cans, the arrangement being such that the cans are picked up while moving at a relatively slow speed and gradually and uniformly accelerated before the same are fed to the machine for operating thereon.

The invention furthermore consists in the improvement in the parts and devices and in the novel combination of the parts and devices herein shown, described or claimed.

In the drawing forming a part of this specification, the figure is a top plan view of a can feeding mechanism shown in connection with a machine for operating on the cans and embodying my improvements.

In said drawing, the dotted lines 10 indicate, diagrammatically, the turret of a machine for flanging or topping can bodies, 11 a stationary table adjacent thereto on to and over which the cans 12 are fed to said machine. The cans are fed on to the table 11 by any suitable means (not shown) and are guided to the pockets in the star wheel 13 by which the cans are conveyed around the circular guide 14 in a well known manner. Located between the star wheel 13 and the machine for operating on the cans, is a rotatable four-armed spider 15 fixed to the rotatable shaft 16, the spider 15 being located above the table 11 as will be understood. Above the spider 15 is rigidly mounted a plate 17 having a volute or other curved edge 18 so arranged that the distance from the axis of rotation of the shaft 16 to the point where the cans are transferred from the star wheel 13 to the spider 15, as indicated at the point 19, is less than at the point, as indicated at 20, where the cans are transferred to the rotatable turret.

A fixed guard or guide rail 21 is provided which is curved to substantially parallel the curved edge 18 of the plate 17.

The cans as advanced by the star wheel 13 are moved relatively slowly and are picked up by the arms of the spider 15 and as the cans are advanced by the latter they are gradually and uniformly accelerated in speed to equal that of the more rapidly moving turret of the machine for operating on the cans, this being accomplished, as will be understood, on account of the fact that the cans are gradually and uniformly moved outwardly farther and farther from the center of rotation of the spider while they are simultaneously being advanced toward the machine.

The foregoing described mechanism is of special advantage when used in connection with a filled can closing machine, since the filled cans may be gradually accelerated from a slow speed to a relatively high speed without danger of spilling any of the can's contents.

Although I have herein shown and described what I now consider the preferred embodiment of my improvements, yet it will be understood that various changes and modifications may be made without departing from the spirit of the invention, and all such changes and modifications are contemplated as come within the scope of the claims appended hereto.

I claim:—

1. A can feeding mechanism of the character described including, in combination: a supporting table; a guideway above said table and along which the articles are adapted to be advanced; an article propelling and gradually accelerating member movable in a path over said table in the guideway, said member being rotatable about an axis perpendicular to the table and located eccentrically of said guideway, and a moving can carrier to which the cans are delivered by said accelerating member, substantially as specified.

2. A can feeding mechanism of the character described including, in combination: a curved guideway along which the articles are adapted to be advanced; a rotatable member having propelling arms extending within said guideway and adapted to advance and gradually accelerate the articles therealong, said member being rotatable about an axis disposed eccentrically to said curved guideway, and a moving can carrier to which the cans are delivered by said accelerating member, substantially as specified.

3. A can feeding mechanism of the character described including, in combination: a stationary table; a uniformly rotatable, multiple-arm spider for advancing articles over said table; means coöperating with the said spider for gradually accelerating the speed of the articles as the same are advanced by the spider, and a can-moving device having substantially the ultimate accelerated speed of said spider and arranged to receive the cans advanced thereby.

4. A can feeding mechanism of the character described including, in combination: a stationary table; a uniformly rotatable, multiple-arm spider for advancing articles over said table; and means for gradually accelerating the speed of the articles as the same are advanced by the spider, said means including a relatively stationary curved guideway arranged eccentrically to the axis of rotation of the spider, and a can-moving device having substantially the ultimate accelerated speed of said spider and arranged to receive the cans advanced thereby.

5. A can feeding mechanism, comprising a uniformly rotatable radial arm, and combined therewith means causing the cans to be engaged by said arm at points nearer to and farther from the center of rotation, to effect retardation and acceleration of the feeding of the cans, and a can-moving device having substantially the ultimate accelerated speed of said arm and arranged to receive the cans advanced thereby.

6. A can feeding mechanism of the character described including, in combination: spaced curved members forming therebetween a curved guideway for the articles being fed; and means for advancing articles along said guideway and simultaneously accelerating the speed thereof, said means comprising a member uniformly rotatable about an axis located eccentrically relative to said curved members, and a can-moving device having substantially the ultimate accelerated speed of said curved members and arranged to receive the cans advanced thereby.

7. A can feeding mechanism of the character described including, in combination: a stationary table; a multiple-arm spider uniformly rotatable in a plane above said table about an axis perpendicular thereto; a stationary plate located above said spider and having a curved edge disposed eccentrically relatively to the axis of rotation of the spider; and a guide rail spaced from and substantially paralleling the curved edge of said plate and forming therewith a curved guideway along which the articles are adapted to be propelled and gradually accelerated by the arms of said spider.

8. The combination of two can-carrying devices which respectively transport the cans at a slower speed and at a faster speed; and an intermediate can feeding device which receives the cans from the slower carrier and delivers them to the faster carrier; said feeding device having means which causes a gradual acceleration of the speed of the cans while it is feeding them.

9. The combination of two can-carrying devices which respectively transport the cans at a slower speed and at a faster speed; and an intermediate can feeding device which receives the cans from the slower carrier and delivers them to the faster carrier; said feeding device having a curved eccentric guide which causes a gradual acceleration of the speed of the cans while it is feeding them.

10. The combination of two can-carrying devices which respectively transport the cans at a slower speed and at a faster speed; and an intermediate can feeding spider which receives the cans from the slower carrier and delivers them to the faster carrier; said spider having means which causes a gradual acceleration of the speed of the cans while it is feeding them.

11. A can feeding mechanism including, in combination: a rotatable turret to which the cans are to be fed and which thereafter transports them bodily; a stationary table on which the cans are placed and from which they are adapted to slide on to the said turret; a rotary can-feeding device which moves the cans at a speed slower than they are moved by the said turret; a second rotary can-feeding device which receives the cans from the first rotary device; and a guiding means which engages the cans while they are moved by the second rotary device and which gradually guides the cans farther from the center of rotation to cause the acceleration of their movement before and when they are delivered to said turret.

12. A can feeding mechanism including, in combination: a rotatable turret to which the cans are to be fed and which thereafter transports them bodily; a stationary table on which the cans are placed and from which they are adapted to slide on to the said turret; a rotary can-feeding device which moves the cans at a speed slower than they are moved by the said turret; a second rotary can-feeding device which receives the cans from the first rotary device; and a curved eccentric guiding means which engages the cans while they are moved by the second rotary device and which gradually guides the cans farther from the center of rotation to cause the acceleration of their movement before and when they are delivered to said turret.

13. A can feeding mechanism including, in combination: a rotatable turret to which the cans are to be fed and which thereafter transports them bodily; a stationary table on which the cans are placed and from which they are adapted to slide on to the said turret; a rotary can-feeding device which moves the cans at a speed slower than they are moved by the said turret, a rotary can-feeding spider which receives the cans from the first rotary device; and a guiding means which engages the cans while they are moved by the said spider and which gradually guides the cans farther from the center of rotation of the said spider to cause the acceleration of the movement of the cans before and when they are delivered to said turret.

Signed at New York, this 13th day of February, 1914, in the presence of two subscribing witnesses.

PAUL W. FLEISCHER.

Witnesses:
C. W. GRAHAM,
W. D. FOSTER.